US007574193B2

(12) United States Patent
Hulkkonen et al.

(10) Patent No.: US 7,574,193 B2
(45) Date of Patent: Aug. 11, 2009

(54) EMERGENCY CALL SUPPORT FOR MOBILE COMMUNICATIONS

(75) Inventors: Tony Hulkkonen, Helsinki (FI); Olivier Guyot, Helsinki (FI)

(73) Assignee: Nokia Corporation, Espoo (FI)

( * ) Notice: Subject to any disclaimer, the term of this patent is extended or adjusted under 35 U.S.C. 154(b) by 25 days.

(21) Appl. No.: 10/762,531

(22) Filed: Jan. 23, 2004

(65) Prior Publication Data

US 2005/0101288 A1    May 12, 2005

(30) Foreign Application Priority Data

Nov. 11, 2003   (GB)   ................................. 0326264.9

(51) Int. Cl.
*H04M 11/04*   (2006.01)
(52) U.S. Cl. ................. 455/404.1; 455/404.2; 455/410; 455/411; 455/414.1; 455/414.2; 455/432.1; 455/521; 455/527; 455/528; 379/45
(58) Field of Classification Search ............. 455/404.1, 455/404.2, 410, 411, 414.1, 414.2, 432.1, 455/436, 521, 527–528; 379/45
See application file for complete search history.

(56) References Cited

U.S. PATENT DOCUMENTS

| | | | | |
|---|---|---|---|---|
| 5,214,789 | A * | 5/1993 | George ........................ 455/440 |
| 5,442,805 | A * | 8/1995 | Sagers et al. ............. 455/456.5 |
| 5,467,388 | A * | 11/1995 | Redd et al. ............. 379/210.02 |
| 5,778,304 | A * | 7/1998 | Grube et al. ............. 455/456.4 |
| 5,797,091 | A * | 8/1998 | Clise et al. ............... 455/404.2 |
| 5,881,131 | A * | 3/1999 | Farris et al. .............. 379/15.03 |
| 5,960,416 | A * | 9/1999 | Block .......................... 705/34 |
| 6,011,973 | A * | 1/2000 | Valentine et al. ......... 455/456.6 |
| 6,201,973 | B1 * | 3/2001 | Kowaguchi ............. 455/456.6 |
| 6,230,017 | B1 * | 5/2001 | Andersson et al. ........ 455/456.6 |
| 6,515,989 | B1 * | 2/2003 | Ronneke ..................... 370/389 |
| 6,571,092 | B2 * | 5/2003 | Faccin et al. ............. 455/404.1 |
| 6,594,492 | B2 * | 7/2003 | Choi et al. .................. 455/436 |
| 6,775,534 | B2 * | 8/2004 | Lindgren et al. ......... 455/404.1 |
| 6,885,857 | B1 * | 4/2005 | Hanson ...................... 455/406 |
| 2002/0002041 | A1 * | 1/2002 | Lindgren et al. ............ 455/404 |
| 2002/0056001 | A1 * | 5/2002 | Magee et al. ............... 709/225 |
| 2003/0108175 | A1 * | 6/2003 | Poikselka et al. ...... 379/210.01 |
| 2004/0121755 | A1 * | 6/2004 | Hurtta ..................... 455/404.1 |

FOREIGN PATENT DOCUMENTS

WO     WO 02/089515 A1    11/2002

* cited by examiner

*Primary Examiner*—Stephen M D'Agosta
(74) *Attorney, Agent, or Firm*—Squire, Sanders & Dempsey, LLP

(57) ABSTRACT

A communication system can include an access network, a core network, and user equipment for connection to the core network through the access network. The access network can be configured to receive a request for network access from the user equipment, to receive network access information from the core network, to selectively control access to the core network for the user equipment in dependence on the network information, to identify a request for an emergency call, and to disable the selective control of access to the core network responsive to identification of an emergency call.

21 Claims, 5 Drawing Sheets

EMERGENCY CALL SUPPORT FOR MOBILE COMMUNICATIONS

FIELD OF THE INVENTION

The present invention relates to the support of calls to emergency telephone numbers in communication systems, and particularly in communication systems where network access is controlled, such as where shared network access is provided for different operators for example.

BACKGROUND OF THE INVENTION

So-called third generation (3G) mobile communication networks are currently being deployed. In Europe such networks conform to various standards formalized by the 3$^{rd}$ Generation Partnership Project (3GPP), which has a number of versions, generally known as releases.

The high price paid for the licenses to operate 3G networks, in particular in Europe, together with the potential high cost of 3G network infrastructure deployment, has motivated network operators to develop innovative strategies in network infrastructure deployment.

One effective way to reduce the investment costs and risks of a fast 3G network deployment is for operators to share parts of, or the whole of, their 3G network infrastructure. In the current dynamic market place, as a result of partnerships, acquisitions, creative agreements and such like amongst operators, equipment manufacturers and service providers, the need for tools that enable various degrees of network sharing is becoming more and more important.

Typically sharing partners have their own dedicated networks, and a further shared network is provided in which all the sharing partners provide services. In 3GPP release 5 (REL-5), a concept known as UTRAN (UMTS terrestrial radio access network) sharing has been introduced in order to bring mobility and access control features to allow correct operation of shared networks. In "UTRAN sharing" the radio access network is divided into shared network areas, which shared network areas further consist of one or more location areas. A user equipment is allowed access to a network area only if it is authorized to. Thus networks must be provided with means for determining whether network access by a particular user equipment is allowed, and preventing a call being established if it is not. Thus a call may not be established if the user equipment is not authorized for the network, or a call may be dropped if a user equipment moves to an unauthorized network.

A basic principle in mobile communication networks, however, is that an emergency call should never be dropped or caused to be dropped due to roaming or other access control restrictions applicable for normal roaming, calls, packet-switched sessions, or other types of transactions.

The proposals for UTRAN sharing in 3GPP REL-5, however, provide for authorization checks to be performed in shared networks such that a call may be terminated if a user equipment (UE) is currently in, or moves into, a network area for which calls are not authorized. This presents the possibility of the shared network control features terminating an emergency call.

In proposals for shared networks, it has been proposed that as part of the establishment of the call, a core network returns to a radio access network the shared network area (SNA) access information (AI) for the UE associated with the call establishment. The radio access network may then use this information to reject the call initially, or 'drop' the call if the UE moves to a network for which call connections are not authorized.

More specifically, in current proposals the core network provides SNA AI to the UTRAN after the signaling connection establishment. SNA AI consists of a set of PLMN (public land mobile network) identities (PLMN-ID), and a set of shared network area codes (SNAC) for each PLMN, which codes indicate the areas the UE is allowed to access. The UTRAN performs access control based on the received user specific SNA AI. That is, the UTRAN allows the UE to access only those shared network areas identified in the SNA AI. If there are no allowed shared network areas available, or if the UE is currently in a 'forbidden' network, then the UTRAN initiates connection release towards the core network and the call is released according to 3GPP REL-5 specifications.

However, as discussed above in the event of an emergency call, the call should not released even if there are no allowed shared network areas available.

In accordance with current 3GPP REL-5 specifications, there is a proposal for handling (circuit switched) emergency voice calls if the RNC and the circuit-switched domain of the core network know that the call is an emergency call. In such circumstances, the circuit switched core network sends a RANAP:COMMON ID message as soon as the IMSI is known, but does not send the SNA AI for the UE. By not transmitting the SNA AI, it is intended that this access information cannot be used to terminate the emergency call, and hence the emergency call will not be dropped due to the SNA access restraints for the UE.

However a problem may arise with this proposal, where a new call between the UE and the network is established in the packet switched domain of the core network, whilst the emergency call in the circuit switched domain is ongoing. The establishment of the packet-switched call may result in the SNA AI being provided to the radio network controller (RNC) of the UTRAN. Thus the RNC may obtain the SNA AI and use this information, potentially leading to the emergency call being dropped.

A further problem may arise if relocation occurs, and the call is transferred to a different network. In such a case, a handover to a target network is performed for the circuit switched emergency call, and its connection (Iu-cs) is relocated to a given target RNC. As a result of this relocation, and as proposed by 3GPP REL-5, the packet switched core network may send the SNA AI for the UE to the target RNC. Thus the target RNC is provided with SNA AI which may cause the emergency call to be dropped.

It is an aim of the invention to address one or more of the above-stated problems.

SUMMARY OF THE INVENTION

In principle, embodiments of the invention may be considered to generally introduce enhancements to allow the UTRAN to know when the call is an emergency call, and to specify the UTRAN behaviour in the case of an emergency call.

In one aspect the invention provides a method of supporting emergency calls in a mobile communications network, comprising: receiving, in a network, a network access from a user equipment; selectively controlling access to the network in dependence on network access information, and disabling the step of selectively controlling access to the network for an emergency call network access.

In one embodiment, the method may include the step of checking if network access information is available. If the network access information is available, then the step of controlling access to the network in dependence on network access information may be selected. If the network access information is not available, then the step of controlling access to the network in dependence on network access information may not be selected.

In another embodiment, the method may not involve a step of checking if network access information is available. The absence of network access information would simply mean that the step of controlling access to the network in dependence on network access information may consider the permitted network access to be unlimited. It may be considered that the absence of network access information is equivalent to the presence of network access information which is indicative of unrestrictive access. The invention does not depend, therefore on the provision of network access information.

The network access information may be shared network area access information.

The method may further include the step of determining if said network access is an emergency call. The step of determining if said network access is for an emergency call may include receiving an indication of the type of network access. The method may further include the step of receiving the indication of the type of network access from the user equipment or from the network.

The network preferably comprises an access network and a core network. The steps of controlling and disabling the access to the network are preferably performed in the access network.

The access network preferably determines if said network access is an emergency call in dependence on receipt of an indication of the type of network access from the core network.

On receipt of an indication of the type of network access being an emergency call, the method may further comprise activating the step of disabling the step of selectively controlling access to the network.

The method may further comprise detecting a network access initiation, and responsive thereto disabling the step of selectively controlling access to the network. Said disabling step may be for a predetermined time period. The method may further comprise the step of detecting establishment of a radio access bearer, and responsive thereto activating the step of disabling the step of selectively controlling access to the network for an emergency call network access. The method may further comprise activating the step of disabling the step of selectively controlling access to the network for an emergency call network access associated with that radio access bearer. Said disabling step may be terminated responsive to a control signal.

The method may further comprise the step of receiving the network access information from the core network.

The method may further include the step of detecting termination of an emergency call, and responsive thereto the step of enabling the means for selectively controlling access to the network.

The method is preferably implemented in a 3GPP mobile communication system.

In another aspect the invention provides a computer program product including computer program code adapted to perform the method.

In another aspect the invention provides a computer program adapted to perform the method.

In a further aspect, the invention provides a network element for enabling emergency calls in a network comprising: network access request receiving means for receiving a network access request from a user equipment; selection means for selectively controlling network access for the user equipment in dependence on network access information; and disabling means for disabling the selection means for an emergency call network access.

The network access information may be shared network area access information.

The network element may further include determining means for determining if said network access is an emergency call.

The determining means may include receiving means for receiving an indication of the type of call.

The indication of the type of network access may be received from the user equipment or from the network.

The network may comprise an access network and a core network. The network element may be in the access network.

The determining means may determine if said network access is an emergency call in dependence on receipt of an indication of the type of network access from the core network.

The network element may further include activating means for activating the disabling means responsive to receipt of an indication of the type of network access being an emergency call.

The network element may comprise means for detecting a network access initiation, and further disabling means responsive to said detecting means for disabling the step of selectively controlling access to the network.

The network element may further include timer means, wherein said further disabling means is activated for a predetermined time period determined by said timer means.

The network element may further comprise detecting means for detecting establishment of a radio access bearer, and activating means responsive thereto for activating the disabling means.

The network element may further comprise means for receiving the network access information from the core network.

The network element may further include detection means for detecting termination of an emergency call, and enabling means responsive thereto for enabling the selection means.

The network element may be a radio network controller of a radio access network.

In a still further aspect the invention provides a communication system comprising: an access network; a core network; and at least one user equipment for connection to the core network through the access network, the access network comprising: means for receiving a request for a network access from the user equipment; means for receiving network access information from the core network; means for selectively controlling access to the core network for the UE in dependence on said network access information; means for identifying a request for an emergency call; and means for disabling the means for selectively controlling access to the network responsive to identification of an emergency call.

The access network may further include means for identifying termination of an emergency call, and means for enabling the means for selectively controlling access to the network responsive to termination of an emergency call.

The means for identifying a request for an emergency call may comprise input means for receiving an emergency call indicator from the user equipment.

The means for identifying a request for an emergency call may comprise input means for receiving an emergency call indicator from the core network.

The access network may further comprise means for disabling the means for selectively controlling access to the network on initiation of a call.

Said means for disabling the means for selectively controlling access to the network on initiation of a call may be activated for a predetermined time period.

The communication system may further comprise detecting means for detecting establishment of a radio access bearer, wherein said means for disabling the means for selectively controlling access to the network on initiation of a call is activated until establishment of a radio access bearer.

The access network may further include detection means for detecting termination of an emergency call, and enabling means responsive thereto for enabling the selection means.

The communication system may further include means for receiving an indication of an emergency call on relocation of the call to the access network.

The communication system may further include means for transmitting an indication of an emergency call on relocation of the call to another access network.

The communication system preferably comprises a 3GPP mobile communication system.

BRIEF DESCRIPTION OF THE DRAWINGS

The invention is described with regard to particular non-limiting examples by way of reference to the accompanying drawings, in which.

DESCRIPTION OF PREFERRED EMBODIMENTS

The invention is described herein by way of reference to specific examples, which illustrate the principles of the present invention in the context of preferred embodiments. In particular, the invention is described in the context of shared network techniques proposed in 3GPP-Rel.5. The invention, however, is not limited to such an environment, and may be more broadly applicable.

In the described environment, it is assumed that a user equipment (UE) establishes a call through a radio access network to a core network. The handling of the call in the radio access network, for the purposes of the described embodiments, is by a radio network controller (RNC) of a UTRAN. The handling of the call in the core network, for the purposes of the described embodiments, is by a mobile switching centre (MSC) server (MSS).

In proposals for shared networks, it is proposed that as part of the establishment of the call, the core network returns to the radio access network the shared network area (SNA) access information for the UE associated with the call establishment. The radio access network may then use this information to 'drop' the call if the UE moves to a forbidden network, or to a forbidden area within a network, for which call connections are not authorized.

Two preferred embodiments of the invention are described herein below for two example scenarios where the user equipment (UE) initiates an emergency call to a core network. In the first example scenario, it is assumed that the UE is aware that the call being made is an emergency call. In the second example scenario it is assumed that the UE is not aware that the call being made is an emergency call.

Figure 1:
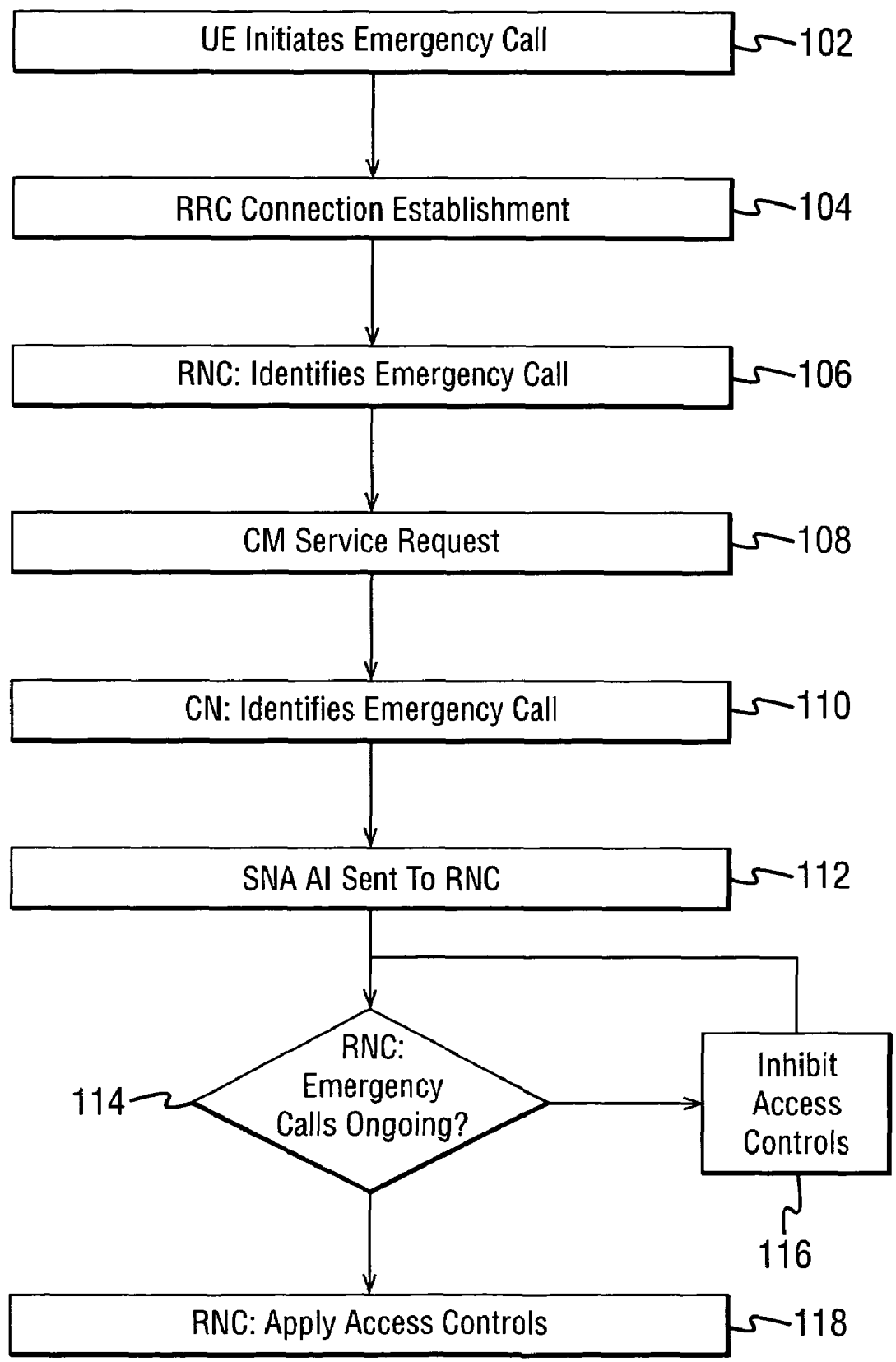
FIG. 1 illustrates a flow diagram of a technique in accordance with a first embodiment of the invention.
Figure 2:
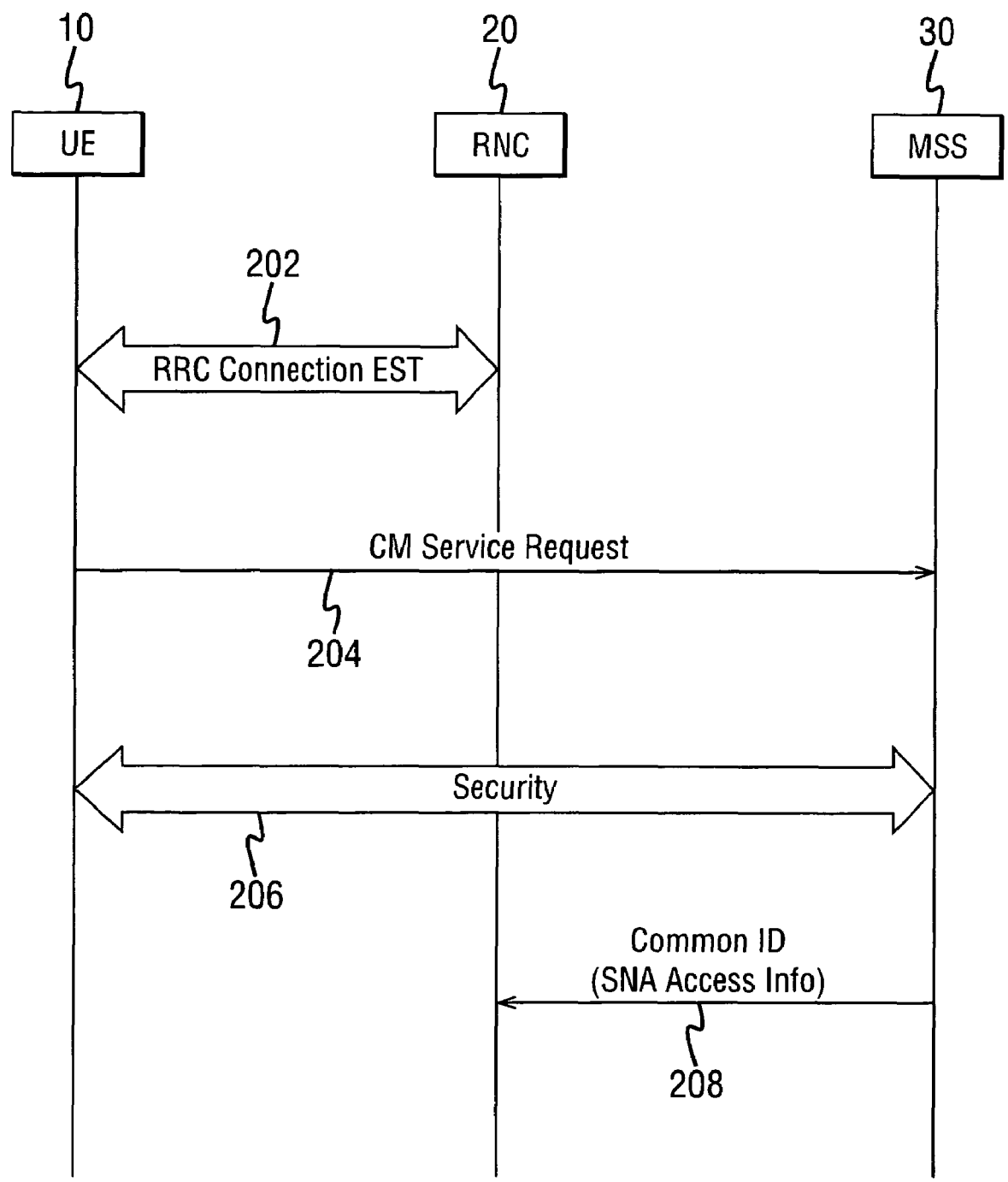
FIG. 2 illustrates a signaling diagram of the technique in accordance with the first embodiment of the invention.

A first embodiment considered is where the UE is aware that the call being made is an emergency call. The first embodiment is described with reference to FIGS. 1 and 2.

The configuration of a network environment incorporating a UE 10, an RNC 20, and a MSS 30 are well known to a skilled person, and outside the scope of the present invention, and therefore not described herein.

The UE 10 may know the call is to an emergency number, based on a comparison of the called number to a set of numbers held in an emergency call number database in the UE. In such case, the UE is adapted to indicate the emergency nature of the call in the initial connection establishment with the mobile network. As represented by step 102, the UE initiates an emergency call.

In a subsequent RRC Connection Establishment between the UE and the radio network controller (RNC) 20 of the UTRAN, as represented by step 104, the signaling 202 from the UE identifies the call as an emergency call. As such, the RNC is notified that the call is an emergency call, as represented by step 106.

After the RRC Connection Establishment, the MSS receives a CM Service Request 204 from the UE in a step 108, via the RNC.

An indication that the call is an emergency call is provided in the CM Service Type parameter in the CM Service Request message sent by the UE. Thus the core network is notified that the call is an emergency call, as represented by step 110, at the very beginning of the call establishment.

The MSS may then initiate security procedures, as represented by signaling 206, in accordance with the provisions of any applicable standard. Preferably at least a security mode setting procedure is performed.

The MSS of the core network determines the IMSI (international mobile subscriber identity) of the UE, and then returns a RANAP: COMMON ID message 208 to the RNC of the UTRAN, as per the 3GPP REL-5 proposals.

The message 208 additionally sends, in step 112, the SNA Access Information for the UE to the RNC in the UTRAN.

In this preferred embodiment of the invention, the SNA access information is sent to the RNC. This transmission of the SNA access information is consistent with REL-5 proposals for the processing of a 'normal' call (i.e. non-emergency call).

This conformity with applicable standard techniques for normal telephone calls requires no adaptation to the core network operation configured for normal telephone calls, and thus enables the core network implementation to be simplified.

In an embodiment, the core network is adapted such that an indication that the call is an emergency call is transmitted in the RAB Assignment Request, for example by use of a flag. Such an embodiment simplifies the UTRAN implementation. The feature of the core network transmitting such a flag to the UTRAN is discussed herein below in the context of the second embodiment. It should be understood, however, that such a feature offers advantages when used in this first embodiment.

As long as the emergency call is ongoing, as detected in step 114, the UTRAN does not perform access control by using the SNA Access Information. Thus, the RNC in the UTRAN inhibits itself in a step 116 from any call termination associated with shared network access control whilst an identified emergency call is proceeding.

In the event that a relocation takes place whilst an emergency call is in progress, as discussed further herein below, steps should be taken to apply similar initializing steps in the RNC to which the call is transferred.

The establishment of the call, including the radio access bearer establishment, then continues in accordance with the applicable standard techniques, which are outside the scope of the present invention.

Once the emergency call is released, the UTRAN may perform access control in a step 118 as it does for all other type calls/sessions/etc in accordance with the applicable standard techniques. Thus the inhibiting of the access control in the RNC is maintained until termination of the emergency call.

As noted, contrary to 3GPP REL-5 it is proposed that where the call is identified as an emergency call, the SNA Access Information is returned to the UTRAN. The adaptation proposed in accordance with the invention allows the SNA Access Information to be transmitted to the UTRAN, whilst still supporting emergency calls, by inhibiting access control based on the SNA Access Information whilst the emergency call is in use. The invention may also be used in combination with the technique proposed in 3GPP REL-5, where the SNA Access Information is not returned to the UTRAN if an emergency call is identified. In such case, the SNA Access Information is not available in the UTRAN, so a UTRAN adapted as above may still be deployed. The inhibiting of the access control does not affect the operation of this feature.

Furthermore, a UTRAN adapted to inhibit the access control during an emergency call is advantageous in a network implemented in accordance with 3GPP REL-5, since in the event that the establishment of a packet switched communication causes the SNA Access Information which would not otherwise be made available to the RNC to reach the RNC, any access control based on such Access Information is inhibited pending the completion of the emergency call.

A second embodiment for the scenario where the UE does not know that the call being established is an emergency call is now described with reference to FIGS. 3 and 4.

When the UE does not know itself that the call is an emergency call, it cannot provide an emergency call indication to the UTRAN in the radio resource control (RRC) connection setup signaling. In a step 302, the UE initially prepares to initiate a call generally towards the RNC of the UTRAN.

Figure 4:
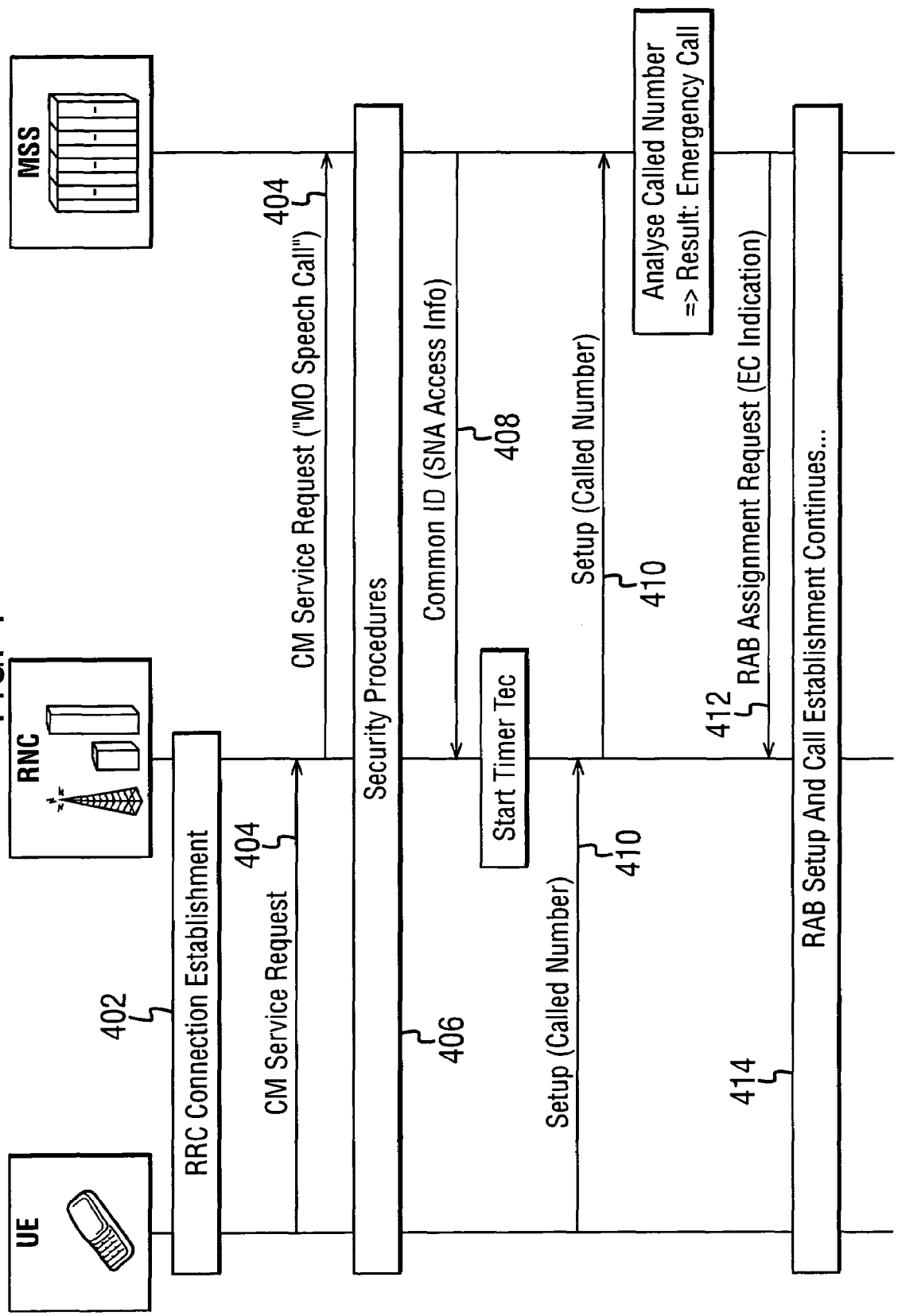
FIG. 4 illustrates a signaling diagram of the technique in accordance with the second embodiment of the invention.

Thereafter in a step 304 the connection setup signaling takes place as represented by the RRC Connection Establishment communications 402 in FIG. 4. In this embodiment, the UE does not indicate that the signaling connection is established due to an emergency call, and the signaling 402 is conventional signaling in accordance with any applicable standard.

After establishment of the RRC Connection, in a step 306 the UE transmits a CM Service Request message 404 to the MSS, via the RNC. The CM Service Request is transparent to the RNC.

Once again, as the UE does not know that the call is an emergency call, the CM Service Request contains no indication of such. The CM service Request message to the MSS indicates "Mobile Originated call establishment" in the CM Service Type in the CM Service Request message, identifying that the call has been originated by the UE.

The MSS may then initiate security procedures, as represented by signaling 406, in accordance with the provisions of any applicable standard. Preferably at least a security mode setting procedure is performed.

After the security procedures, the MSC of the MSS sends a RANAP:Common ID message 408 to the RNC. The Common ID message 408 includes any SNA Access Information specified for the user, as represented by step 308. This information identifies the shared network areas that the UE may access. If the UE is not authorized to share any common networks, then an indication of this is returned from the core network to the UTRAN.

According to Release 5 3GPP specifications, upon reception of SNA Access Information, the RNC should perform access control, and immediately initiate release of the connection if the UE does not have any access right in the current location area. However, in accordance with the principles of the invention, the RNC is adapted as discussed hereinafter.

Upon reception of the SNA Access Information, the RNC inhibits the access control procedures in a step 322. The RNC is thus adapted such that it does not, at this stage, initiate a release of any established connection even if the UE has entered a forbidden area.

The RNC further, in a step 318, starts an emergency call timer, which has a count Tec. The operation of the emergency call timer is described in further detail hereinafter.

The UE then initiates a call establishment by sending a CALL CONTROL Setup message 410 to the MSS via the RNC, as represented by step 310. This Setup message identifies the number called by the UE.

At the MSS, the MSC analyses the called number. Where the called number is an emergency number, the MSC identifies the called number as an emergency number, as represented by step 312.

A RAB Assignment Request message 412 is sent to the RNC in a step 314, and the MSC indicates to the UTRAN that the RAB is to be established for an emergency call, as represented by step 316.

Thereafter, in a step 318 RAB establishment and call establishment continues normally, in accordance with any applicable standard technique, as represented by signaling 414.

However, as described hereinabove the UTRAN is adapted such that the access controls have been inhibited in step 322. The UTRAN is further adapted such that it does not release the established connection as long as an emergency call is ongoing, even if the UE enters a forbidden area. A forbidden area is an area for which the UE does not have shared network access.

Thus, as illustrated by step 321, after RAB establishment the RNC monitors an established emergency call. As long as the emergency call remains established, the access control is inhibited in step 322. When the RNC detects termination of the emergency call, then in a step 324 the RNC reverts to normal operation and applies any access control mechanism in accordance with applicable techniques. If the RAB establishment is not for an emergency call in the first place, then the process moves immediately to step 324.

A scenario may arise where a collision occurs with another RAB establishment, for example an incoming voice or data call RAB establishment. In such a scenario, the RNC may be adapted to apply SNA access control for the other RAB, it not being an emergency call. Alternatively, the RNC may inhibit SNA access control for all calls until the determination of whether an emergency call is present is made, and then apply SNA access control to non-emergency calls.

As discussed hereinabove, in this embodiment for all UE initiated transactions, the RNC starts the emergency call timer, preferably at the time the SNA access information is returned to the RNC. The purpose of the emergency call timer is to provide a time-out operation in the event that an emergency call is not established within a fixed time period. For example, the call which the UE wishes to establish may not be a voice call, but may be a SMS (short messaging service) network access. The SMS call does not require establishment of any access bearers, and thus the RNC may wait at step 318 whilst the UE proceeds with SMS services. Where the UE is not authorized to access the network, such SMS messages need to be prevented and the connection terminated.

This potential problem is overcome in this embodiment of the invention by providing the emergency call counter. The time count of the emergency call counter Tec is set to be an appropriate period to allow for initialization of an emergency call. If an emergency call has not been established in that time period, then the network access which the UE is attempting to establish is not an emergency call.

Figure 3:
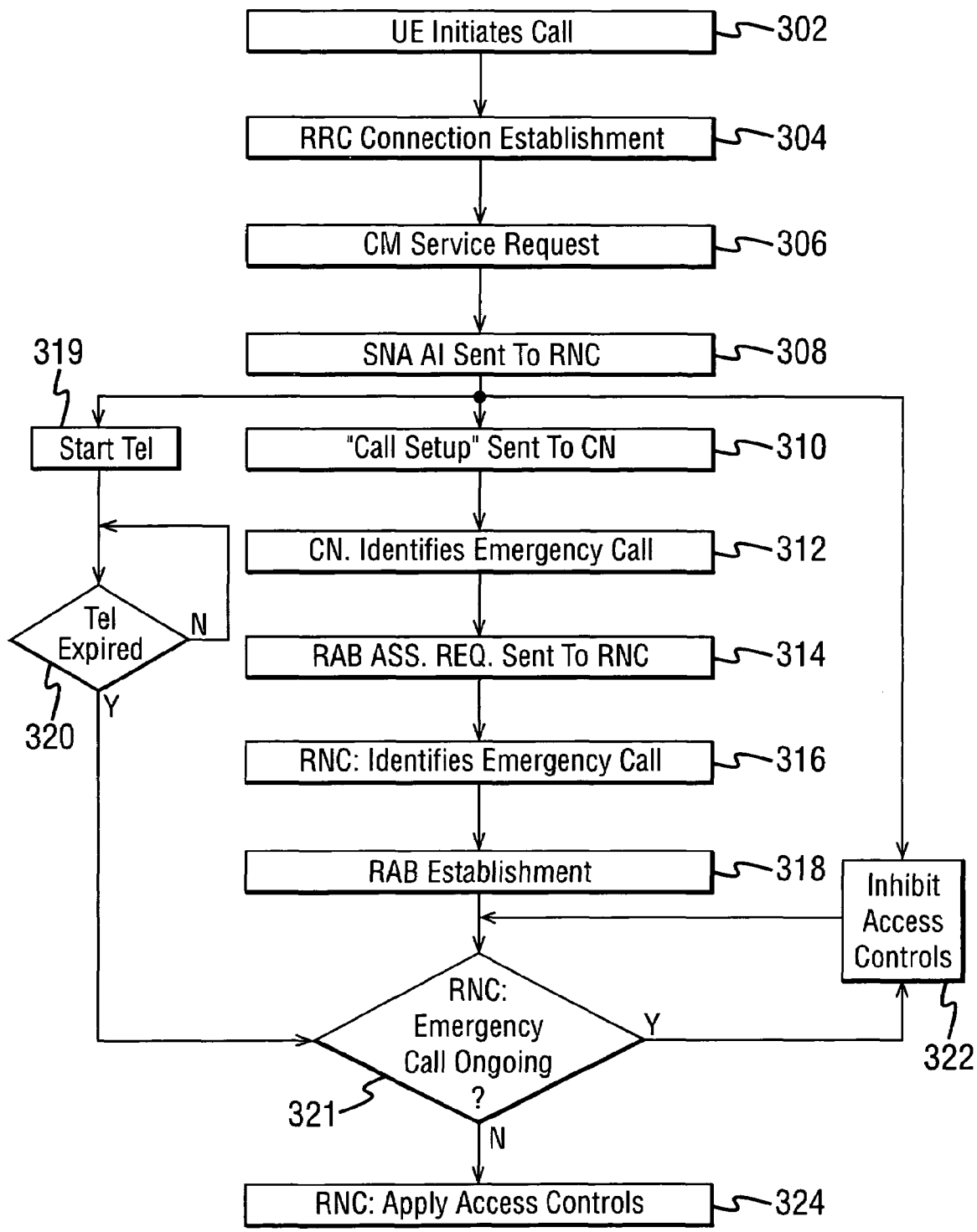
FIG. 3 illustrates a flow diagram of a technique in accordance with a second embodiment of the invention.

Thus, referring to FIG. 3, in a step 320 the count Tec is monitored, and when the count expires the method moves on to query step 316 wherein it is determined if an emergency call has been established. If no emergency call has been established, then in step 324 normal access control is applied.

In the embodiment in which the emergency call timer is used, the implementation may be summarized as follows. The Tec timer may only start when the SNA access control function rejects the access, and the RNC does not have any indication that an emergency call is ongoing for which access control should be inhibited. Whilst the Tec timer is running, the RNC does not release and radio access bearers or any RRC/Iu connection independently, the SNA access control is inhibited. The Tec timer then may only expire when: i) the RNC receives a RAB ASSIGNMENT with an emergency call flag set; ii) the RNC receives the IU RELEASE COMMAND from the core network; or iii) the configured time expires. For (ii), if there are two domains the RNC only releases the Iu toward the domain that initiates the Iu release.

It will be understood from the above that the purpose of the emergency call timer is to prevent the inhibiting of access control for an emergency call resulting in a user establishing calls of other types in a network. This is envisaged as one possibility for achieving this, and the invention is not limited to the use of the emergency call timer as described herein. Other techniques may be provided to address this problem.

One example of another technique is described hereinafter. In current 3GPP REL-5 SNA control function, if the access for a given UE is rejected by the RNC as a result of the SNA access information, the RNC sends an IU RELEASE REQUEST message to the core network, with a cause value of 'access restricted due to shared network' and the RNC may drop the call immediately i.e. the RRC and Iu connection. In a proposed alternative, the RNC will only release the RRC and Iu connection after it receives a RANAP:IU RELEASE COMMAND from the core network.

Where this proposed alternative is implemented, the Tec timer described above becomes unnecessary. In this alternative, either the core network sends the RANAP:RAB ASSIGNMENT REQUEST message with the emergency call flag set, or it sends the RANAP:IU RELEASE COMMAND message. The core network releases the Iu with the RANAP:IU RELEASE COMMAND message after some NAS signaling. The NAS signaling may be via a RANAP: DIRECT TRANSFER message, such as a NAS indication of an LAU (local area update) reject).

Thus, this alternative solution ensures that the UTRAN waits for a command from the core network before releasing the RRC and Iu connection, and may be used in environments where the RNC can rely upon receiving a command from the core network. The RNC is not allowed to release the RRC/Iu connection before the IU RELEASE COMMAND is received from the core network.

If, at the expiry of the RAB assignment, and after determination that the call is not an emergency call, in step 324 the UTRAN is allowed to initiate connection release whenever the UE enters a forbidden area, in accordance with the applicable techniques for access control.

In a preferred embodiment, the RNC is adapted to apply the techniques described herein to all network access requests. Thus, if a UE has an ongoing emergency call, and is in a forbidden area, access control is applied to any other network accesses made by the mobile. This would prevent, for example, a user making an emergency call in a forbidden area from using the emergency call override functionality provided by this invention to also surf the Internet. Whilst in current implementation it is envisaged that emergency calls are made through the circuit switched domain, the embodiments of the invention may be applied to all network accesses, whether they originate in the circuit switched domain or the packet switched domain. The RNC is preferably adapted such that in general it inhibits network access control for emergency calls, but performs access control for other network accesses or for connections originating in the core network.

The two embodiments described hereinabove with reference to FIGS. 1 to 4 concern the case where an emergency call is detected on establishment of a new call by a UE, to ensure that the SNA AI does not cause such call to be dropped. It is also important to ensure that the emergency call is not dropped as a result of SNA AI techniques if the call is relocated from one network to another due to the UE moving, and embodiments of the invention permit this.

In the case of relocation of the RAB for the emergency call, whilst the call is ongoing, in the described embodiments of the invention the source RNC knows the call is an emergency call, i.e. has an emergency call indicator. The emergency call indicator being set effectively inhibits any access control techniques.

In order to ensure appropriate handling of the call on relocation, the emergency call indicator is preferably provided to the target RNC by the core network in an adapted RELOCATION REQUEST message, in addition to the SNA Access Information.

The RELOCATION REQUEST message is a message used in 3GPP for handling a relocation, and specifically in 3GPP REL-5 for additionally providing, if available, the SNA Access Information of the UE with which the call is established to the target RNC. The relocation mechanism itself is outside the scope of the present invention, and will be familiar to one skilled in the art. This embodiment of the invention proposes inserting an indication of whether the call is an emergency call in this message, and more generally this may be considered to be a step of notifying the target RNC as to whether the relocated call is an emergency call.

Thus the target RNC may handle the emergency call in the same way as the source RNC adapted in accordance of the first and second embodiments of the invention as described hereinabove, in dependence on receiving an indication that the call is an emergency call.

This applies for either case, independent of whether the UE originally knew of the emergency call or not. Where the UE knew of the emergency call, the information is available to the original RNC through the RRC Connection Setup signaling. Where the UE did not know of the emergency call, the information is available in the RANAP:RAB ASSIGNMENT REQUEST message provided to the RNC.

In a further arrangement, the RNC may have already been relocated once or more on relocation, in which case the RNC may have become aware of the emergency status of the call through any technique described hereinabove.

Figure 5:
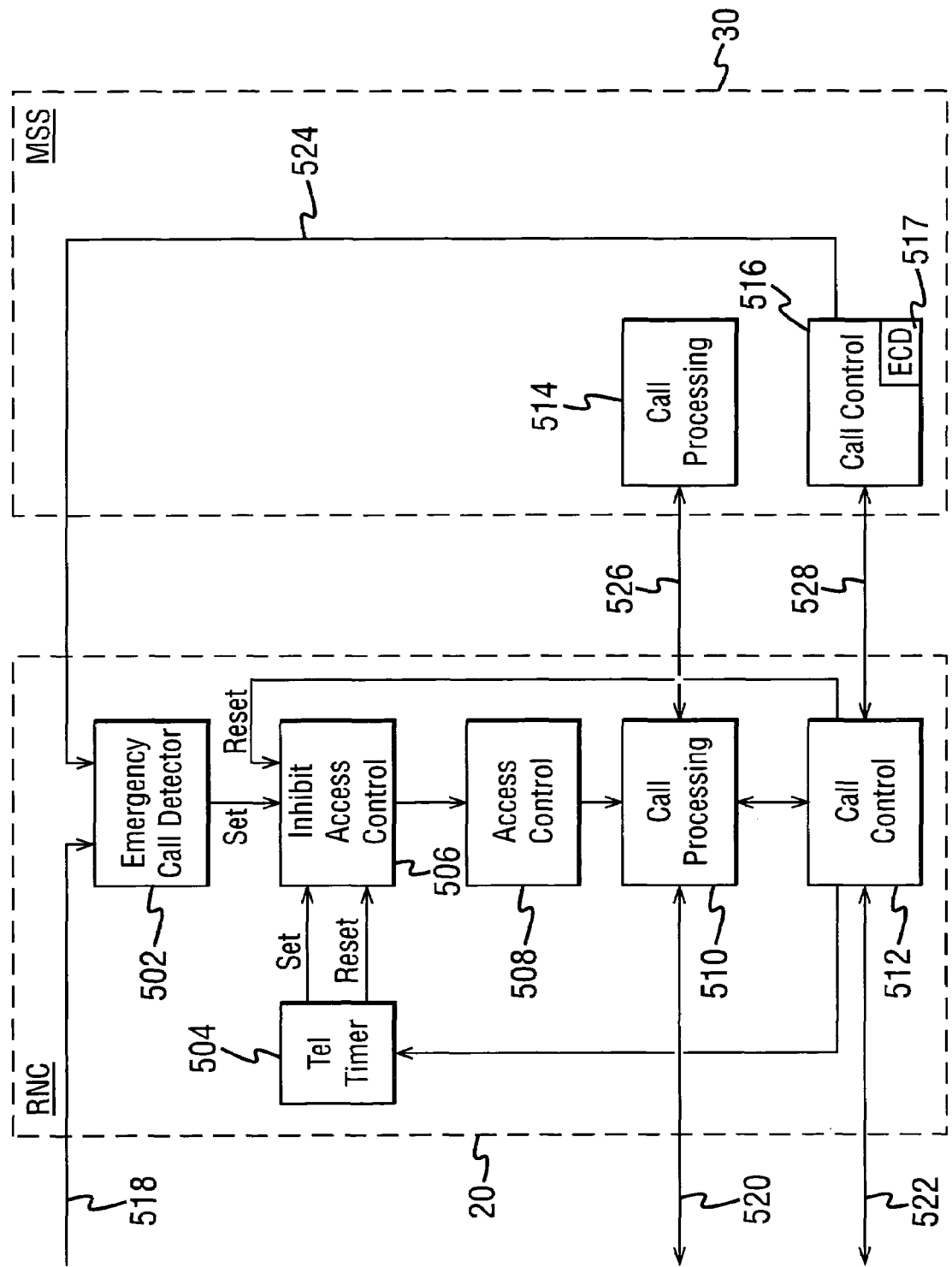
FIG. 5 illustrates the functional elements for performing the techniques of the first and second embodiments in a network environment.

Referring now to FIG. 5, there is illustrated in block diagram form the main functional elements required in the UTRAN and the core network for implementing the described embodiments of the invention. Only those functional elements required for implementing the invention are described. One skilled in the art will appreciate that other functional elements are required for the correct implementation of the system.

As shown in FIG. 5, the RNC includes an emergency call detector block 502, an inhibit access control block 506, an access control block 508, a call processing block 510, a call control block 512, and a Tec timer 504. The MSS includes a call processing block 514 and a call control block 516.

The emergency call detector detects an emergency call, as discussed in the embodiments above, either by direct notification from the UE on a line 518, or by notification from the MSS on a line 524. When notification is received from the MSS, the call control block 516 of the MSS detects the emergency call in an emergency call detector ECD 517 thereof, and sets the notification signal on line 524.

The emergency call detector block 502 sets a control line SET to the inhibit access control block 506 to inhibit access control, when an emergency call is detected. The Tec timer block 504 similarly sets a control line SET to the inhibit access control block 506 to inhibit access control during call initialization.

When set, the inhibit access control block 506 controls the access control block 508 to inhibit access control, and the access control block does not carry out any processing.

In FIG. 5, the call processing block 510 of the RNC represents the block through which calls are set-up, in the direction of the UE on line 520 and in the direction of the core network on lines 526. The control processing block 512 of the RNC represents the block through which control signaling is exchanged, in the direction of the UE on line 522 and in the direction of the core network on lines 528.

The call processing block 514 of the MSS represents the block through which calls are set-up in the direction of the RNC on line 526. The control processing block 516 of the MSS represents the block through which control signaling is exchanged, in the direction of the RNC on line 528.

As illustrated further in FIG. 5, the inhibit access control block 506 is reset by a RESET signal from either the Tec timer 504 (provided the signal is not set from the emergency call detector block 502), or the call control block 512 when the emergency call is terminated.

The arrangement of FIG. 5 is suitable for implementation of either the first or second described embodiment. The embodiments may be implemented in combination, to cater for any eventuality.

It should be noted that the invention is described herein with reference to exemplary embodiments. In particular the embodiments described are for supporting emergency calls in 3GPP REL-5 shared network area environments. The invention is not, however, limited to such environments.

The Release 5 Shared Networks Access Control is specified in the following 3GPP specifications: 3GPP TS 25.413: "UTRAN Iu interface RANAP signalling"; 3GPP TS 25.410: "UTRAN Iu Interface: General Aspects and Principles"; 3GPP TS 25.401: "UTRAN Overall Description"; 3GPP TS 23.003: "Numbering, addressing and identification"; —3GPP TS 23.009: "Handover procedures"; and 3GPP TS 48.008: "Mobile Switching Centre—Base Station System (MSC-BSS) interface; Layer 3 specification".

More generally, the invention is applicable in any network environment where some access control to the network is required, and where emergency calls must be supported.

Thus whilst the environment in which the invention is deployed is preferably one in which a UE, or a user associated with a UE, must have authority to utilize a shared network area, the inventive principles extend to deployment in any network environment where authorization is required to establish a call.

Although in the embodiments the access control is facilitated in the access network, this is because current proposed standards all rely upon such location of the control mechanism. Alternatively the principles of the present invention may be readily applied, where the implementation requires, elsewhere in the network, such as in elements of the core network.

Furthermore, the invention is not limited to any specific access network or core network implementation. Whilst the described embodiments relate to the use of an RNC of a UTRAN and an MSS of a core network, generally the functionality described may be implemented in any network element of the radio access network or the core network.

For the implementation of embodiments of the invention, communication systems supporting shared network areas require adaptation in one and/or the other of the RNC and the MSC/MSS.

It should be noted that the invention may be utilized in roaming scenarios, where agreements between operators allow use of each others networks. However, the invention is not limited to roaming scenarios. The invention applies to any scenario where a mobile terminal or user equipments attempts to establish a call to a network. In embodiments, the mobile may have moved under a scenario other than a roaming scenario. However in attempting to make a connection, whether the mobile has moved, by roaming or otherwise, is irrelevant.

One skilled in the art will appreciate the modifications and adaptations which may be made to the described embodiments, and principles which may be extended to other implementations, without departing from the scope of the invention, which is defined by the appended claims.

The invention claimed is:

1. A method, comprising:
   receiving, by a receiver, a network access request from a user equipment in a network, said network comprising an access network and a core network;
   determining, by a determiner, if the network access request is an emergency call in dependence on receipt of an indication, received from the core network, that the network access request is an emergency call;
   receiving, by the receiver, network access information relating to the user equipment, the network access information indicating the areas the user equipment is allowed to access;
   detecting, by a detector, establishment of a radio access bearer;
   disabling, by a disabler, selective access to the network in response to determining that the network access request is an emergency call and in response to detecting the establishment of the radio access bearer, which disabling is activated only for a predetermined time period and for the emergency call network access associated with the established radio access bearer;
   detecting, by a detector, termination of the emergency call; and terminating, by a terminator, the disabling responsive to a control signal and responsive to the detecting the termination of the emergency call.

2. The method according to claim 1, wherein the receiving includes receiving the network access information that comprises network area access information.

3. The method according to claim 1, wherein the disabling selective access includes selectively controlling the network.

4. The method according to claim 3, wherein the disabling selective access is performed in the access network.

5. The method according to claim 1, wherein the receiving comprising:
receiving the network access information from the core network.

6. The method according to claim 1, further comprising:
performing the method in a third generation partnership project mobile communication system.

7. The method of claim 1, further comprising:
receiving said indication in said network access request.

8. A computer program product embodied on a computer readable medium including computer program code, the computer program code configured to perform a method, the method comprising:
receiving a network access request from a user equipment in a network, said network comprising an access network and a core network;
determining if the network access request is an emergency call in dependence on receipt of an indication, received from the core network, that the network access request is an emergency call;
receiving network access information relating to the user equipment, the network access information indicating the areas the user equipment is allowed to access;
detecting establishment of a radio access bearer;
disabling selective access to the network in response to determining that the network access request is an emergency call and in response to detecting the establishment of the radio access bearer, which disabling is activated only for a predetermined time period and for the emergency call network access associated with the established radio access bearer;
detecting termination of the emergency call; and
terminating the disabling responsive to a control signal and responsive to the detecting the termination of the emergency call.

9. An apparatus, comprising:
a network access request receiver configured to receive a network access request from a user equipment in a network, said network comprising an access network and a core network;
a determiner configured to determine if the network access request is an emergency call in dependence on receipt of an indication, received from the core network, that the network access request is an emergency call;
a network access information receiver configured to receive network access information relating to the user equipment, the network access information indicating the areas the user equipment is allowed to access;
an access controller configured to selectively control network access for the user equipment in dependence on the network access information;
a detector configured to detect establishment of a radio access bearer;
a disabler configured to disable the access controller for an emergency call, said disabler being activated in response to said determiner determining said network access request is an emergency call and in response to said detector detecting the establishment of the radio access bearer, which disabler is configured such as to be activated only for a predetermined time period and for the emergency call network access associated with the established radio access bearer;
a second detector configured to detect termination of the emergency call; and
a terminator configured to terminate the disabling responsive to a control signal and responsive to the second detector detecting the termination of the emergency call.

10. The apparatus according to claim 9, wherein the network access information is shared network area access information.

11. The apparatus according to claim 9, wherein the access network comprises the apparatus.

12. The apparatus according to claim 9, further comprising:
a timer, wherein the predetermined time period is determined by the timer.

13. The apparatus according to claim 9, wherein the apparatus is configured to receive the network access information from the core network.

14. The apparatus according to claim 9, wherein the apparatus is a radio network controller of a radio access network.

15. The apparatus of claim 9, wherein said network access request receiver is configured to receive said indication in said network access request.

16. A system, comprising:
an access network;
a core network; and
at least one user equipment configured to connect to the core network through the access network,
wherein the access network is configured to
receive a request for network access request from the user equipment,
determine if the network access request is an emergency call in dependence on receipt of an indication, received from the core network, that the network access request is an emergency call,
receive network access information relating to the user equipment from the core network, the network access information indicating the areas the user equipment is allowed to access,
detect the establishment of a radio access bearer,
disable selective controlling of access to the network in dependence on determining that the network access request is an emergency call and detecting the establishment of a radio access bearer, which disabling is activated only for a predetermined time period and for the emergency call network access associated with the established radio access bearer;
detect termination of the emergency call; and
terminate the disabling responsive to a control signal and responsive to the detection of the termination of the emergency call.

17. The system of claim 16,
wherein the access network is configured to receive an indication of the emergency call on relocation of the call to the access network.

18. The system of claim 16,
wherein the access network is configured to send an indication of the emergency call on relocation of the call to another access network.

19. The system of claim 16, further comprising a third generation partnership project mobile communication system.

20. An apparatus, comprising:
network access request receiving means for receiving a network access request from a user equipment in a network, said network comprising an access network and a core network;
determining means for determining if the network access request is an emergency call in dependence on receipt of indication, received from the network, that the access request is an emergency call;
network access information receiving means for receiving network access information relating to the user equipment, the network access information indicating the areas the user equipment is allowed to access;
selection means for selectively controlling network access for the user equipment in dependence on the network access information;
means for detecting establishment of a radio access bearer; and
disabling means for disabling the selection means for an emergency call, said disabling means being activated in response to said determining means determining said network access request is an emergency call and in response to said detecting means detecting the establishment of the radio access bearer, which disabling means is configured such as to be activated only for a predetermined time period and for the emergency call network access associated with the established radio access bearer;
second means for detecting configured to detect termination of the emergency call; and
termination means configured to terminate the disabling means responsive to a control signal and responsive to the second means for detecting the termination of the emergency call.

21. A system, comprising:
an access network;
a core network; and
at least one user equipment for connection to the core network through the access network,
wherein the access network comprises
network access request receiving means for receiving a network access request from a user equipment in a network;
determining means for determining if the network access request is an emergency call in dependence on receipt of an indication, received from the core network, that the access request is an emergency call;
network access information receiving means for receiving network access information relating to the user equipment, the network access information indicating the areas the user equipment is allowed to access;
selection means for selectively controlling network access for the user equipment in dependence on the network access information;
means for detecting establishment of a radio access bearer;
disabling means for disabling the selection means for an emergency call, said disabling means being activated in response to said determining means determining said network access request is an emergency call and in response to said detecting means detecting the establishment of the radio access bearer, which disabling means is configured such as to be activated only for a predetermined time period and for the emergency call network access associated with the established radio access bearer;
second means for detecting configured to detect termination of the emergency call; and
termination means configured to terminate the disabling means responsive to a control signal and responsive to the second means for detecting the termination of the emergency call.

* * * * *